United States Patent [19]

Redfarn

[11] 4,269,944
[45] May 26, 1981

[54] COMPOSITION FOR FORMING AN INTUMESCENT MATERIAL

[75] Inventor: Cyril A. Redfarn, London, England

[73] Assignee: Dixon International Limited, Pampisford, England

[21] Appl. No.: 150,426

[22] Filed: May 16, 1980

Related U.S. Application Data

[63] Continuation-in-part of Ser. No. 874,513, Feb. 2, 1978, Pat. No. 4,210,725.

[51] Int. Cl.³ .............................................. C08J 9/00
[52] U.S. Cl. .................................... 521/100; 521/83; 521/136; 521/187; 521/907
[58] Field of Search ................ 521/907, 100, 83, 136, 521/187; 260/DIG. 24

[56] References Cited

U.S. PATENT DOCUMENTS

| | | | |
|---|---|---|---|
| 2,566,964 | 9/1951 | Scholtz | 260/DIG. 24 |
| 2,684,953 | 7/1954 | Stilbert, Jr. | 260/DIG. 24 |
| 3,037,951 | 6/1962 | Basto | 521/907 |
| 3,979,341 | 9/1976 | Widmann | 521/188 |
| 4,013,599 | 3/1977 | Strayss et al. | 521/907 |
| 4,043,950 | 8/1977 | Wilmsen | 521/907 |
| 4,210,725 | 7/1980 | Redfarn | 521/100 |

Primary Examiner—Morton Foelak
Attorney, Agent, or Firm—Weingarten, Maxham & Schurgin

[57] ABSTRACT

An improvement in intumescent compositions is provided comprising, in part, melamine formaldehyde resin, a cross-linking agent, and a hydrophilic setting agent. The composition chemically absorbs water to yield an intumescent material with reduced cracking properties which decomposes into gas and a solid foam residue upon heating.

12 Claims, 1 Drawing Figure

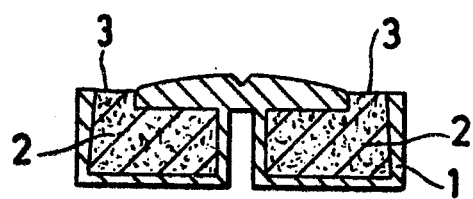

COMPOSITION FOR FORMING AN INTUMESCENT MATERIAL

CROSS REFERENCE TO RELATED APPLICATION

This is a continuation-in-part of United States patent application Ser. No. 874,513 filed Feb. 2, 1978 now U.S. Pat. No. 4,210,725 patented July 1, 1980.

FIELD OF THE INVENTION

The present invention relates to a composition for forming an intumescent material. The intumescent material when exposed to heat swells (i.e. intumesces) and in the intumesced state is capable of acting as a fire-resistant barrier or sealant.

DISCUSSION OF THE PRIOR ART

Intumescent material has been used to provide a fire-resistant barrier or sealant in gaps e.g. between a door and adjacent structure, e.g. the jamb, and between a window and an adjacent structure, e.g. the window frame.

In British Patent Applications Nos. 42584/74, 9166/75 and 31219/75, there are proposed intumescent materials comprising urea formaldehyde resin constituents, the intumescent material swelling when exposed to heat and in the intumesced state being capable of acting as a fire-resistant barrier or sealant between adjacent structures. It is proposed in those applications to have the intumescent material retained in a holder for securing to one of the structures. The material may be put into the holder in the form of a paste or slurry which is allowed to set in the holder. Alternatively, instead of applying the material into the holder, the material may be applied into a gap between the structures or onto a surface of one of the structures and then allowed to set. After setting, the intumescent material dries out and ages. It has been found that there was a tendency for the intumescent material to crack during setting, drying or ageing.

It is believed that the cracking is due in the main to the urea formaldehyde content of the intumescent material. The resin is hydrophilic to an appreciable extent when cured and we believe that evaporation of water temporarily held by the cured resin gives rise to the cracking.

SUMMARY OF THE INVENTION

The primary object of the invention is to provide an intumescent material wherein cracking is substantially reduced or eliminated.

Accordingly, the present invention provides a composition for forming an intumescent material which upon heating decomposes into gas and a solid foam residue comprising: a water-dispersible melamine formaldehyde prepolymer resin which when cured is hydrophobic; an inorganic hydrophilic setting agent which chemically absorbs water and hardens quickly causing the composition to set; a cross-linking agent present in an amount to cure the prepolymer resin, the cross-linking agent being a short length hydrocarbon having multiple amido groups free for bonding; an ammonium phosphate; polyvinyl acetate; a solid polyhydroxy compound; and reinforcing fibrous material.

The invention also provides an intumescent material which decomposes into gas and expands into a solid foam residue upon heating comprising: a hydrophobic melamine formaldehyde resin in which the curing agent is at least one polyamido compound which is a short length hydrocarbon having multiple amino groups, a hydrated inorganic setting agent which has chemically absorbed water to make the intumescent material coherent, an ammonium phosphate, polyvinyl acetate, a solid polyhydroxy compound, and reinforcing fibrous material.

In addition, a method for making the intumescent material is provided comprising: combining as a mixture water-dispersible melamine formaldehyde resin, a hydrophilic setting agent, a cross-linking agent which is a short length hydrocarbon having multiple amido groups free for bonding, an ammonium phosphate, a polyhydroxy compound, polyvinyl acetate, and reinforcing fibrous material; adding water to said mixture to form a paste or slurry; holding the mixture at room temperature for 48 hours; and optionally accelerating maturing of the mixture at 40° C. for 24 hours.

It will be appreciated that the present invention is limited to the use of melamine formaldehyde resin alone without using any other resin; the invention need not and ordinarily will not contain any urea-formaldehyde resin constituent whatsoever.

DESCRIPTION OF THE PREFERRED EMBODIMENTS

The present invention provides both a primary composition for the making of an intumescent material and a prepared coherent intumescent material. The primary composition employs melamine formaldehyde prepolymer resin which is water dispersible. This prepolymer resin depends upon the cross-linking agent present within the composition to cure it into a hydrophobic cross-linked resin.

The melamine formaldehyde resin in the composition preferably is in powder form or is in the form of a liquid having a solids content of at least 75% by weight.

The setting agent may be calcium sulphate hemihydrate (plaster of Paris), Portland cement or high alumina cement or a mixture of such agents.

The cross-linking agent is provided in order to promote satisfactory cold curing of the resin and serves for cross-linking with the methylol groups on the prepolymer resin molecules. The cross-linking agent may be one or more polyamido compounds, short length hydrocarbons having multiple amine groups free for bonding, such as dicyandiamide and/or guanidine. Either of these cross-linking agents will also serve to enhance the degree of intumescence of the material when exposed to heat.

The ammonium phosphate, which is preferably monoammonium phosphate or diammonium phosphate, in admixture with the melamine resin, serves as the main source of the intumescence of the material.

The fibrous reinforcing material may be wood flour, hammer milled glass fibres or disintegrated nylon fibres.

The solid polyhydroxy compound may be pentaerythritol or a sugar.

In general it is preferred that the amounts of the various ingredients in a composition according to the invention (and the amount of water added thereto when forming an intumescent material) vary by no more than ±10%, more preferably no more than ±5%, from the basic proportions given in the Table below.

TABLE

| Ingredient | Basic relative proportions |
|---|---|
| Melamine formaldehyde prepolymer resin | 1 |
| Ammonium phosphate | 1 |
| Cross-linking agent | ½ |
| Pentaerylthritol (or other solid polyhydroxy compound) | 1/5 |
| Calcium sulphate hemihydrate | ½ |
| Polyvinyl acetate | 1/25 |
| Fibrous reinforcing agent | 1/20 |
| Water | ⅔ |

The primary composition for making an intumescent material according to the invention preferably comprises: 90 to 110 parts by weight of the water-dispersible melamine formaldehyde prepolymer resin; 90 to 110 parts by weight of the setting agent; 45 to 55 parts by weight of the cross-linking agent; 90 to 110 parts by weight of the ammonium phosphate; 3.6 to 4.4 parts by weight of the polyvinyl acetate; 18 to 22 parts by weight of the solid polyhydroxy compound and 4.5 to 5.5 parts by weight of the reinforcing fibrous material; these parts by weight being based on a total of 250 parts by weight of the melamine resin, the setting agent and the cross-linking agent.

The preferred composition described above is preferably admixed with 56 to 69 parts by weight of water per 100 parts by weight of the melamine formaldehyde prepolymer resin in preparing the intumescent material according to the invention. The water added to the dry composition mixture will dissolve the cross-linking agent to initiate the cross-linking process with the melamine formaldehyde prepolymer resin. Additional free water will be liberated by the cross-linking reaction. The water present by initial admixture and liberated by the cross-linking reaction will be absorbed by the calcium sulphate hemihydrate as it becomes calcium sulphate dihydrate. By this mechanism, cracking of the intumescent material will be reduced.

The prepared intumescent material according to the invention preferably comprises: the hydrophobic cured melamine formaldehyde resin; the cured resin being formed from prepolymer residues of 90 to 110 parts by weight of water-dispersible melamine formaldehyde prepolymer and 45 to 55 parts by weight of at least one polyamido compound which includes short length hydrocarbons having multiple amido groups such as guanadine and dicyandiamide; 90 to 110 parts by weight of the setting agent; 90 to 110 parts by weight of the ammonium phosphate; 3.6 to 4.4 parts by weight of the polyvinyl acetate; 18 to 22 parts by weight of the solid polyhydroxy compound; 4.5 to 5.5 parts by weight of the reinforcing fibrous material; and 56 to 69 parts by weight of water; these parts by weight being based on an amount of the intumescent material obtained from a total of 150 parts by weight of the melamine formaldehyde prepolymer and the curing agent.

The invention is illustrated by the following examples.

EXAMPLE 1

The following composition is made as a dry powder suitable for stocking by intermixing the following constituents in a dry powder state:

Melamine formaldehyde resin powder: 3800 g
Monoammonium phosphate: 4200 g
Dicyandiamide: 2000 g
Pentaerythritol: 800 g
Calcium sulphate hemihydrate: 1100 g
Water dispersible polyvinyl acetate powder: 150 g
Wood flour (passing through 90 mesh): 25 g The plaster of Paris is of the kind which exhibits high expansion during setting.

Water (2400 g) is intermixed with the above dry composition immediately before it is to be put into a holder strip. The mixture thus formed is a slurry which can be pumped into the holder if tubular. The holder is loaded quickly with the slurry because of the setting action of the calcium sulphate hemihydrate which begins as soon as the water has been added. In tests carried out up to the present, the slurry mixture is allowed to stand in the holder for 2 days at room temperature, the holder if tubular thereafter being slotted along one face by a milling cutter to expose the mixture, which is thereafter matured at 40° C. for 24 hours. The holder containing the mixture is then ready for application as a fire-resistant seal.

A water absorption test carried out on the matured mixture showed it to increase in weight by about 7% after a 24 hour immersion. It is therefore advisable to waterproof the mixture as soon as the standing and maturing periods are complete in order to improve the shelf and service life of the fire-resistant seal produced. Waterproofing can be effected by coating the matured mixture or material in the holder with polyurethane resin.

The intumescent material with the composition set out above and as a layer of 8 mm wide × 4 mm thick and 1 meter long exhibited no cracking when examined 1 year after being put in the holder.

The holder is preferably of metal of high thermal conductivity such as aluminium, but may be of rigid plastics such as rigid PVC or ABS.

To make a wet mix ready for immediate intermixing with additional water to form a paste or slurry for immediate loading into a holder, the polyvinyl acetate powder in the foregoing composition may be replaced by 300 g of a vinyl resin emulsion (50% solids), the amount of additional water being reduced by 150 g to 2250 g.

The foregoing composition can be adapted to the production of a plaster of Paris mix, for application, when made into a paste, to gaps round the jambs and lintel of a door and to surface areas generally, where intumescence under conflagration conditions is advantageous. To this end ordinary plaster of Paris as used by builders is used in the composition, and the proportion of plaster of Paris is as high as is consistent with an acceptable degree of intumescence. This modification of the invention is illustrated by Example 2 below.

EXAMPLE 2

A first mix is prepared consisting of:
Calcium sulphate hemihydrate: 4800 g
Dicyandiamide: 2000 g
Pentaerythritol: 800 g
Water-dispersible polyvinyl acetate powder: 150 g
Wood flour (passing through 90 mesh): 250 g
A second mix is prepared consisting of:
Monoammonium phosphate: 4200 g
Melamine formaldehyde resin powder: 3800 g Equal parts by weight of the first and second mixes are admixed together and water is added to make a trowellable paste which can be applied to surface areas generally and becomes an intumescent material.

An example of a suitable holder is shown in the accompanying drawing which is a cross-sectional view of the holder.

The holder shown in the drawing is in the form of a strip 1 of uniform cross-section defining two grooves 5 each loaded with intumescent material 2. The holder 1 has slots 3 forming the mouths of the grooves.

A fire test was carried out using a sealing device consisting of the holder shown in the drawing containing intumescent material prepared and loaded into the holder as described in the Example 1 above. The holder was formed of aluminium. The test is described below.

The fire test was primarily a test for fire resistance on a wooden door according to British Standard 476; Part 8: 1972, Item 7. The door consisted of chipboard faced with plywood covered by PVC (polyvinyl chloride). The door was a two part swing door intended for hospital use. The door was located in a doorway, the top edge and the side edges of the doorway being fitted with fire barrier material. At the meeting stile down the middle of the two parts of the door, the sealing device according to the invention, was fitted, the sealing device being located in a groove in one of the door parts with its slots facing the other door part.

A combustion chamber behind the door contained gas jets directed across the inside door face. The jets were lit and the temperature rose to about 800° C. in 30 minutes and was held at about 850° C. for a further 30 minutes.

After 10 to 15 minutes from the start up there was a heat surge and the recorded temperature rose to about 950° C. This was ascribed to the exothermic reaction as the inside PVC facing on the door was combusted. At the end of the test run, that is 60 minutes from starting up the outside of the door, the seal in the stile was intact. Thus the intumescent material had complied with the test requirements.

The heating was continued for another 10 minutes to see whether any breakdown would take place. At 3–5 minutes of extra time the door itself started to buckle at th bottom of the meeting stile, some smoke started to seep out at that place.

Thus, the sealing device, according to the invention started to fail only after the door itself had failed.

Sealing devices as described above were also subjected to accelerated ageing tests to determine the thickness of intumesced material known as "puff" formed after various amounts of accelerated ageing.

The results of the tests were as follows:
before ageing: 20 mm puff
after ageing equated with one year: 19 mm puff
after ageing equated with five years: 25 mm puff
after ageing equated with eight years: 23 mm puff The thickness of the puff was measured in the direction normal to the width of the slots in the holders.

What is claimed is:

1. An intumescent material upon heating decomposes into gas and a solid foam residue comprising:
    cured hydrophobic melamine formaldehyde resin in which the curing agent is selected from the group consisting of guanidine and dicyandiamide;
    a hydrated inorganic setting agent, said setting agent having chemically absorbed water to make the intumescent material coherent;
    an ammonium phosphate;
    polyvinyl acetate;
    a polyhydroxy compound; and
    reinforcing fibrous material.

2. An intumescent material which upon heating decomposes into gas and an expanded solid foam residue comprising:
    cured hydrophobic melamine formaldehyde resin in which the curing agent is selected from the group consisting of dicyandiamide and guanadine calcium sulphate dihydrate;
    monoammonium diphosphate;
    polyvinyl acetate;
    pentaerythritol; and
    wood flour.

3. The composition as recited in claim 1 wherein said inorganic setting agent is selected from the group consisting of calcium sulphate dihydrate, Portland cement, and high alumina cement.

4. The intumescent material as recited in claim 1 wherein said ammonium phosphate is selected from the group consisting of monoammonium diphosphate and diammonium phosphate.

5. The intumescent material as recited in claim 1 wherein said polyhydroxy compound is a sugar.

6. The intumescent material as recited in claim 1 wherein said polyhydroxy compound is pentaerythritol.

7. The intumescent material as recited in claim 1, wherein said reinforcing fibrous material is selected from the group consisting of wood flour, hammer milled glass fibers and disintegrated nylon fibers.

8. The intumescent material as recited in claim 1 comprising:
    said cured hydrophobic melamine formaldehyde resin, the cured resin being formed from prepolymer residues of 90 to 110 parts by weight of water-dispersible melamine formaldehyde prepolymer and 45 to 55 parts by weight of said curing agent;
    90 to 110 parts by weight of said inorganic setting agent;
    90 to 110 parts by weight of said ammonium phosphate;
    3.6 to 4.4 parts by weight of said polyvinyl acetate;
    3.6 to 4.4 parts by weight of said polyvinyl acetate;
    18 to 22 parts by weight of said polyhydroxy compound; and
    4.5 to 5.5 parts by weight of said reinforcing fibrous material, these parts by weight being based upon an amount of the intumescent material obtained from a total of 150 parts by weight of the melamine formaldehyde prepolymer and the curing agent.

9. A method for making an intumescent material which upon heating decomposes into gas and an expanded solid foam residue, said method comprising the steps of
    combining as a mixture water-dispersible melamine formaldehyde prepolymer resin an inorganic hydrophilic setting agent selected from the group consisting of dicyandiamide and guanidine, an ammonium phosphate, polyvinyl acetate, a polyhydroxy compound, and reinforcing fibrous material;
    adding water to said mixture to form a paste or slurry;
    and holding said paste or slurry mixture at room temperature for a predetermined period of time.

10. A method according to claim 9, wherein the slurry is poured into a container before being held at room temperature for said predetermined period of time, whereby the intumescent material is formed within the container.

11. A method according to claim 9, wherein the paste is applied to a surface before being held at room temperature for said predetermined period of time.

12. A method of curing the melamine formaldehyde prepolymer of claim 9, which consists of holding the mixture between room temperature and 40° C. cross-linked by the dicyandiamide or the guanadine.

* * * * *

UNITED STATES PATENT AND TRADEMARK OFFICE
CERTIFICATE OF CORRECTION

PATENT NO. : 4,269,944
DATED : May 26, 1981
INVENTOR(S) : Cyril A. Redfarn

It is certified that error appears in the above-identified patent and that said Letters Patent are hereby corrected as shown below:

Column 2, line 49, "amine" should read --amino--;

Column 4, line 32, "1 meter" should read --1 metre--;

Column 5, line 41, "th bottom" should read --the bottom--;

Column 6, line 37, "3.6 to 4.4 parts by weight of said polyvinyl acetate;" should be deleted.

Signed and Sealed this

Eighth Day of September 1981

[SEAL]

Attest:

GERALD J. MOSSINGHOFF

Attesting Officer    Commissioner of Patents and Trademarks